(12) United States Patent
Ferrarese

(10) Patent No.: US 10,532,399 B2
(45) Date of Patent: Jan. 14, 2020

(54) MACHINE FOR CONTINUOUS CASTING OF A LEAD ALLOY FOR FORMING A CONTINUOUS STRIP OF GRIDS FOR PLATES OF ELECTRIC STORAGE BATTERIES

(71) Applicant: SOVEMA GROUP S.P.A., Villafranca di Verona (IT)

(72) Inventor: Luciano Ferrarese, Lavagno (IT)

(73) Assignee: SOVEMA GROUP S.P.A., Villafranca di Verona (IT)

( * ) Notice: Subject to any disclaimer, the term of this patent is extended or adjusted under 35 U.S.C. 154(b) by 0 days.

(21) Appl. No.: 16/163,597

(22) Filed: Oct. 18, 2018

(65) Prior Publication Data

US 2019/0111475 A1    Apr. 18, 2019

(30) Foreign Application Priority Data

Oct. 18, 2017  (IT) ........................ 102017000118022

(51) Int. Cl.
*B22D 11/06* (2006.01)
*B22D 11/00* (2006.01)
*H01M 4/73* (2006.01)

(52) U.S. Cl.
CPC .......... *B22D 11/064* (2013.01); *B22D 11/001* (2013.01); *B22D 11/0611* (2013.01); *B22D 11/0697* (2013.01); *H01M 4/73* (2013.01)

(58) Field of Classification Search
CPC . B22D 11/064; B22D 11/001; B22D 11/0611; B22D 11/1634; B22D 11/0642; B22D 11/0697; B22D 25/04
See application file for complete search history.

(56) References Cited

U.S. PATENT DOCUMENTS 4,544,014 A    10/1985  McLane et al.
4,545,422 A *  10/1985  McLane ................ B22D 25/04
                                                           164/133

FOREIGN PATENT DOCUMENTS

CN         203316694       12/2013
JP           3221150       10/2001

\* cited by examiner

*Primary Examiner* — Kevin P Kerns
*Assistant Examiner* — Steven S Ha
(74) *Attorney, Agent, or Firm* — Mark M. Friedman

(57) ABSTRACT

Machine for continuous casting of a lead alloy for forming grids for plates of electric storage batteries, which comprises a rotary drum having an external peripheral surface with a plurality of grooves obtained according to the grid design to be made and a sliding block coupled in sliding relation with the external surface of the rotary drum and with a distribution duct obtained in order to insert the molten lead in the plurality of grooves. The plurality of grooves comprises circumferential notches and transverse notches that meet in respective vertices. At the vertices and within the circumferential notches, a plurality of studs are placed that are intended to shape corresponding corners of smoothed form of the grids.

10 Claims, 12 Drawing Sheets

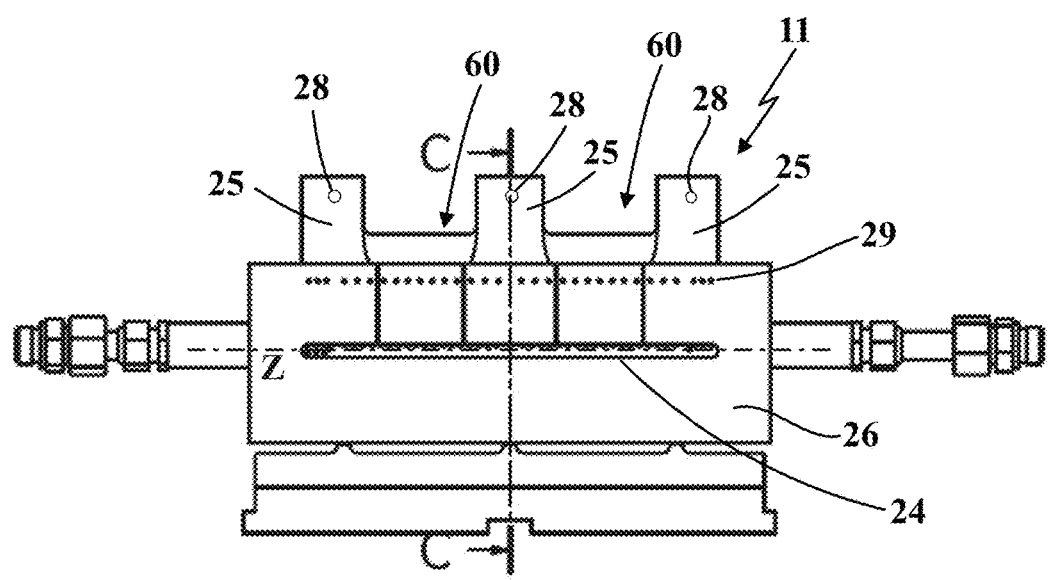
Fig. 7
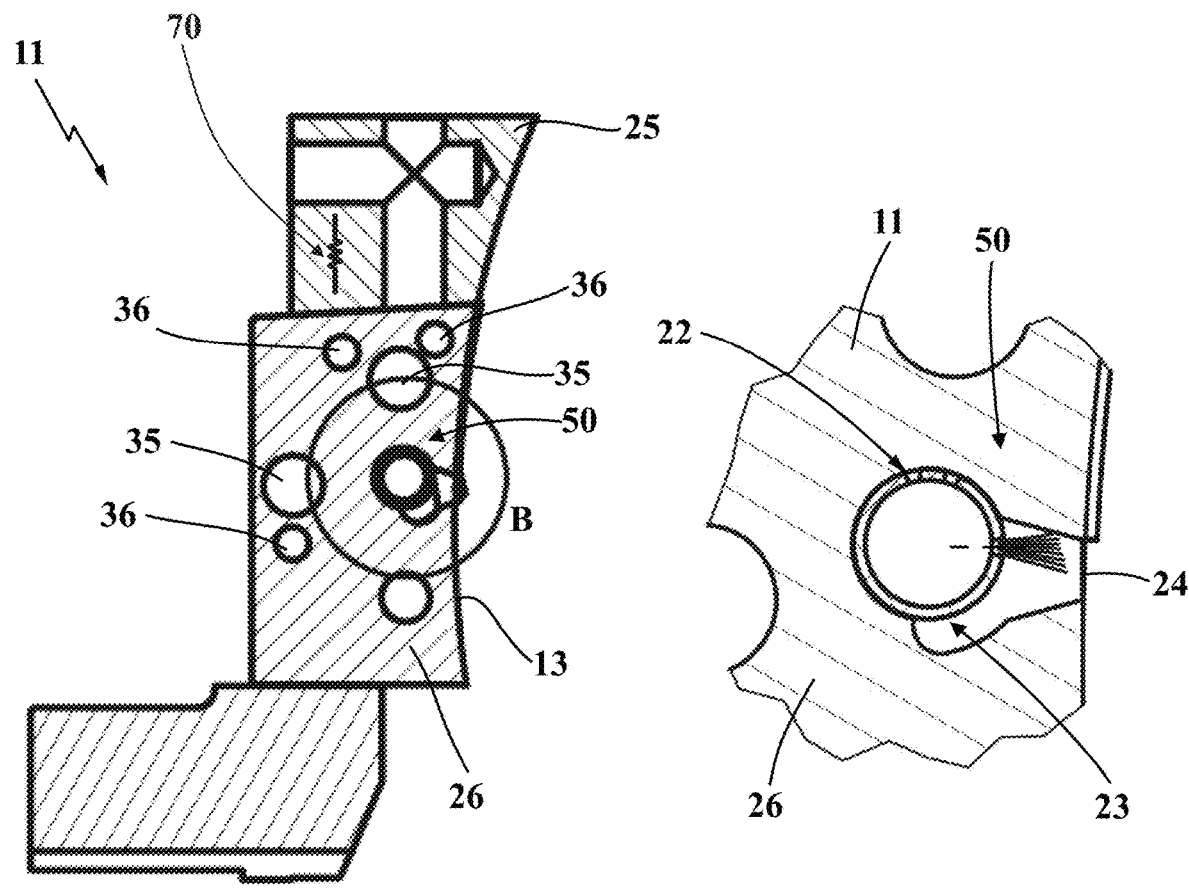
Fig. 8
Fig. 9

MACHINE FOR CONTINUOUS CASTING OF A LEAD ALLOY FOR FORMING A CONTINUOUS STRIP OF GRIDS FOR PLATES OF ELECTRIC STORAGE BATTERIES

FIELD OF APPLICATION

The present invention regards a machine for continuous casting of a lead alloy for forming grids for plates of electric storage batteries.

The present machine is intended to be employed in the production processes of the electric storage batteries for producing a continuous strip of grids made of lead, which is then cut into segments for the formation of the single grids intended to be employed with positive or negative polarity in the storage batteries.

The grids function both as electric conductor and mechanical support for the active material necessary for the electrochemical reactions. They are inserted with the two different polarities in the box-like body of the storage batteries in an electrolytic solution bath, in order to attain the redox reactions necessary for producing electrical energy.

STATE OF THE ART

It is well-known that the industrial production of grids made of lead has to reconcile high production needs and high mechanical and chemical performances. In particular, the grids must have high mechanical performances in order to support the active material without elongation and more generally without deformation during the different use conditions. In addition, the grids must have chemical performances that prevent the onset of corrosion phenomena, which would limit the lifetime duration thereof, especially in the case of grids for positive polarity.

In order to be able to reach the desired standards in terms of mechanical and chemical properties, it is important to obtain a structure that is as uniform as possible.

There are several known technologies for the industrial production of lead grids. Among these, there is the continuous formation technology (continuous grid making) by means of machines for continuous casting of molten lead.

In particular, continuous grid forming technology is described for example in the U.S. Pat. No. 4,544,014 and provides for the use of a machine for continuous casting of a molten lead alloy on a rotary drum having—made on the external peripheral surface—a plurality of grooves distributed according to the design of the grid of the storage battery that one wishes to make. More in detail, the molten lead alloy is distributed in the grooves of the drum by means of a sliding block provided with a reduced/thinned slit and fixedly mounted on the machine, sealed against the surface of the drum parallel to the rotation axis Y of the latter.

More clearly, the sliding block is maintained in contact and under pressure against the surface of the drum by means of screws which synergistically act with provided load cells in order to correctly distribute the pressure, in a manner per se already known to the man skilled in the art. Therefore, with the term fixed it must be intended that the sliding block is mounted on the load-bearing structure of the machine so to be stopped with respect to the drum, which instead rotates.

The sliding block has a curved surface opposite the rotary drum and shaped in a manner corresponding to the external peripheral surface of the drum. The reduced/thinned slit is in communication with a distribution duct made longitudinally in the sliding block and continuously fed with the molten lead, which is drawn by means of a pump from a crucible.

The molten lead is then distributed within the grooves of the rotary drum by the reduced/thinned slit while the sliding block achieves a scraping on the drum parts circumscribed to the grooves. The excess molten lead returns into the crucible through an outlet duct from the sliding block.

The sliding block is heated by means of heating elements in order to allow the lead to remain in the liquid state and thus completely reach all the differently-oriented grooves of the rotary drum which form the design of the grid, as well as the grooves which form the enlarged edge of the grid.

The sliding block is maintained at controlled temperature, for example by means of air puffs, in order to allow the solidification of the lead filaments within the grooves.

The continuous strip of grid, being solidified, is separated from the drum and sent to a coiler. The machine is then provided with rotary knives that cut and discard the material with every reel change.

Such machine for producing a continuous strip of grids made of lead allows reaching considerable production speeds, considerably improving the productivity. Therefore, it is well-known that this machine type is able to continuously make grids made of lead with high productivity (e.g. around 40 m/min) and good mechanical characteristics.

From the continuous strip of lead grids, it is possible to separate the single lead grids by means of cutting and shearing operations executed after the solidification in a downstream apparatus termed separator in the technical jargon of the field. One drawback of such machines is represented by the fact that the lead grids thus obtained have a rectangular external perimeter with sharp edges, which makes the correct subsequent operation of wrapping the grids difficult since the sharp edges can cut the wraps during the insertion of the grids, and then cause the formation of electric bridges during the use of the storage battery.

A further drawback is represented by the fact that the elimination of these sharp corners would require further shearing processing on the grids, which would negatively affect the productivity and the production costs.

PRESENTATION OF THE INVENTION

In this situation, the problem underlying the present invention is therefore that of overcoming the drawbacks manifested by the machines of known type by providing a machine for continuous casting of a lead alloy for forming a continuous strip of grids for plates of electric storage batteries, which allows obtaining grids with high mechanical performances while maintaining high productivity.

A further object of the present finding is to make a machine that allows producing grids suitable for not damaging the wraps in a provided successive wrapping step thereof.

A further object of the present finding is to allow the solidification of a continuous strip of lead grids without incurring problems of oxidation and/or diverse solidification of the threads of the grids being formed.

A further object of the present finding is to make a machine that is structurally simple and entirely reliable in operation.

In particular, due to this machine, it is possible to produce a continuous strip of grids made of lead which maintains a high production speed while producing molded grids which already have smoothed corners.

The machine according to the invention is also simultaneously structurally simple and entirely reliable in operation.

BRIEF DESCRIPTION OF THE DRAWINGS

The technical characteristics of the finding, according to the aforesaid objects, can be clearly seen in the contents of the below-reported claims and the advantages thereof will be more evident in the following detailed description, made with reference to the enclosed drawings, which represent a merely exemplifying and non-limiting embodiment of the invention, in which:

FIG. 7 shows the sliding block for the distribution of the molten alloy of FIG. 6 in a front view;

FIG. 8 shows a sectional view of the sliding block of FIG. 7 made along the trace C-C of FIG. 7;

FIG. 9 shows an enlarged detail of FIG. 8 relative to a distribution system for distributing the molten lead;

DETAILED DESCRIPTION OF A PREFERRED EMBODIMENT

Figure 1:
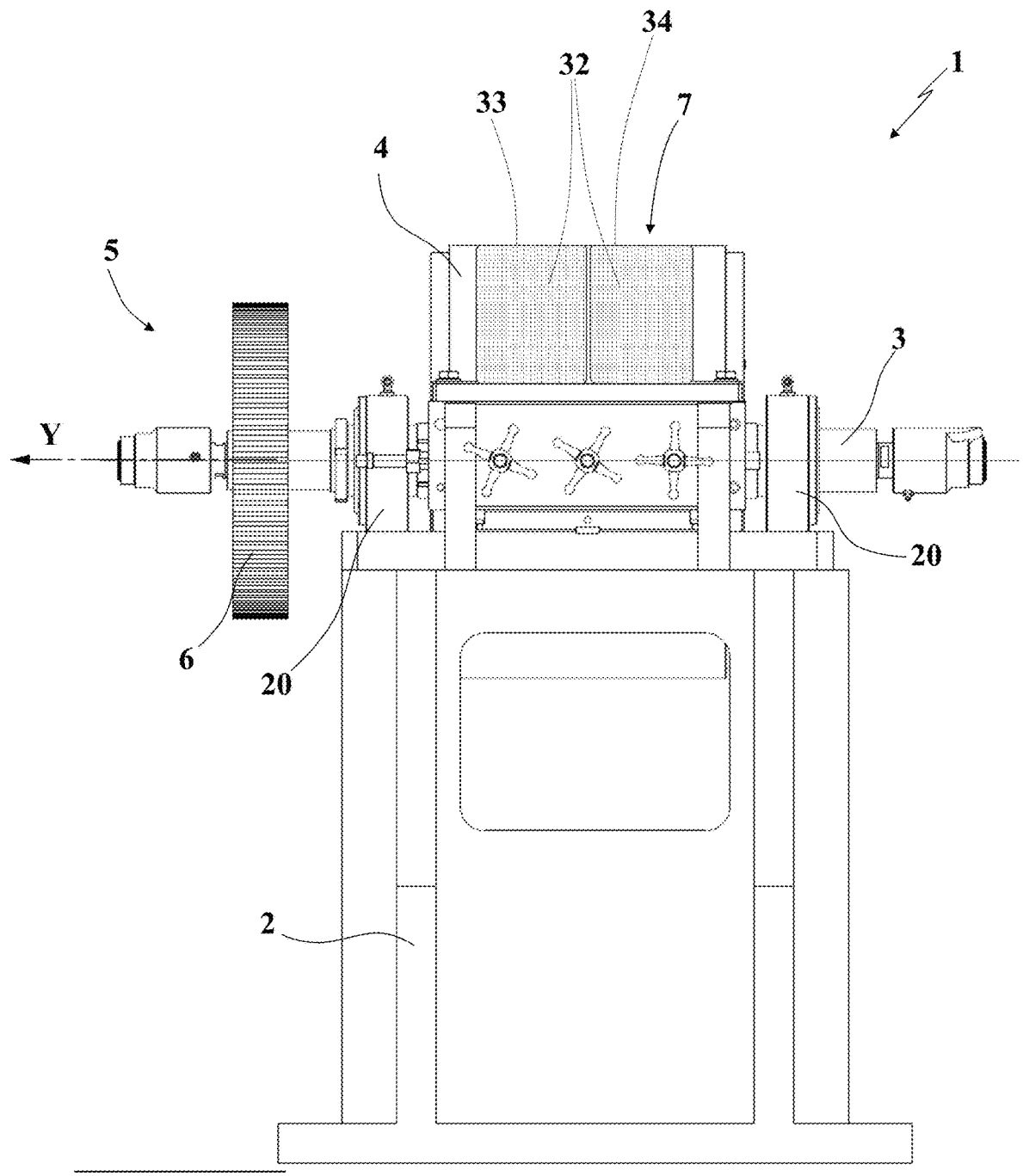
FIG. 1 shows a side view of a first embodiment of a machine for continuous casting of a lead alloy for forming a continuous strip of grids for plates of electric storage batteries, according to the present invention.
Figure 2:
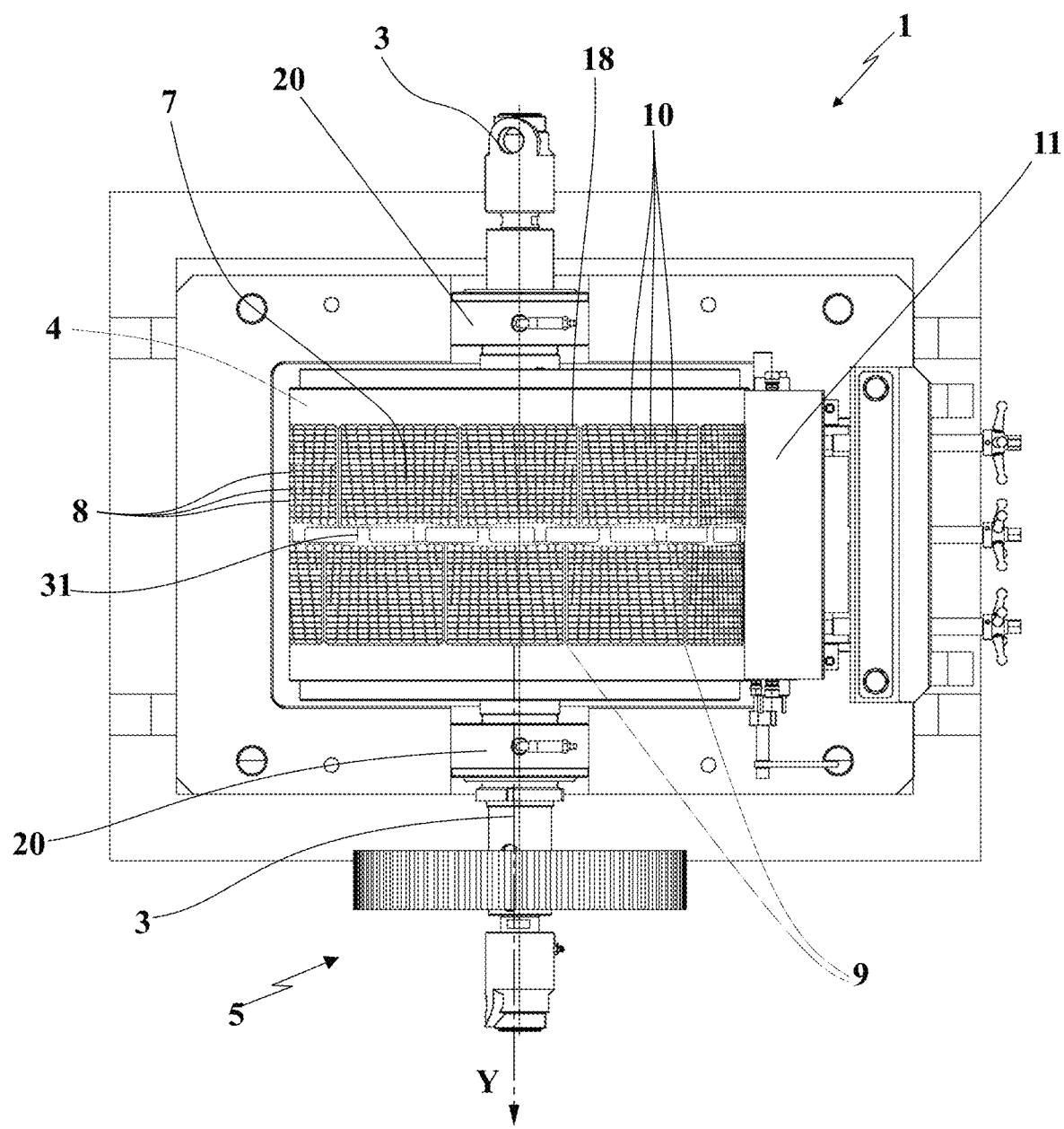
FIG. 2 shows the machine of FIG. 1 in a plan view.
Figure 3:
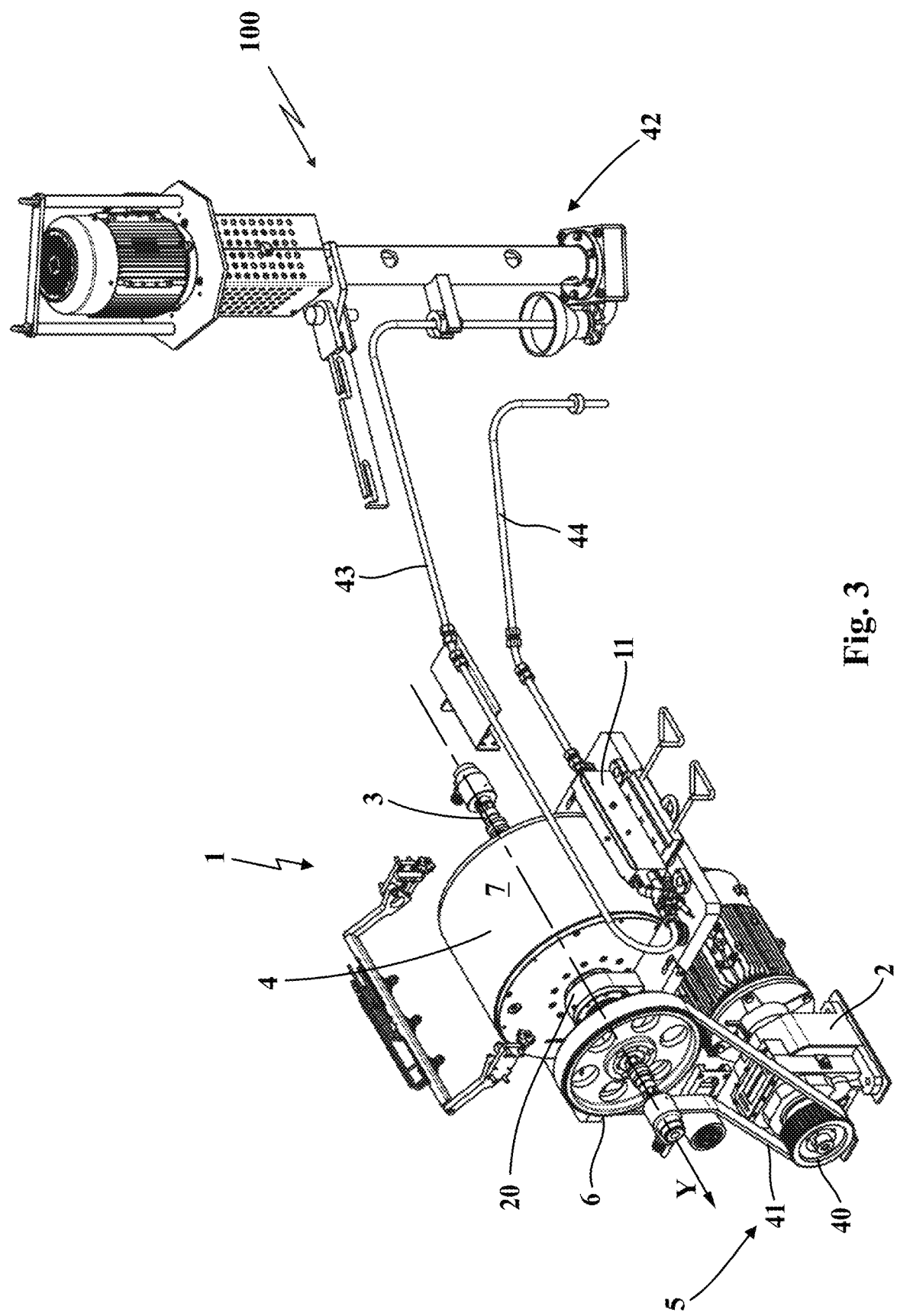
FIG. 3 shows the machine according to the invention in an overall view associated with a molten lead feeding system.
Figure 4:
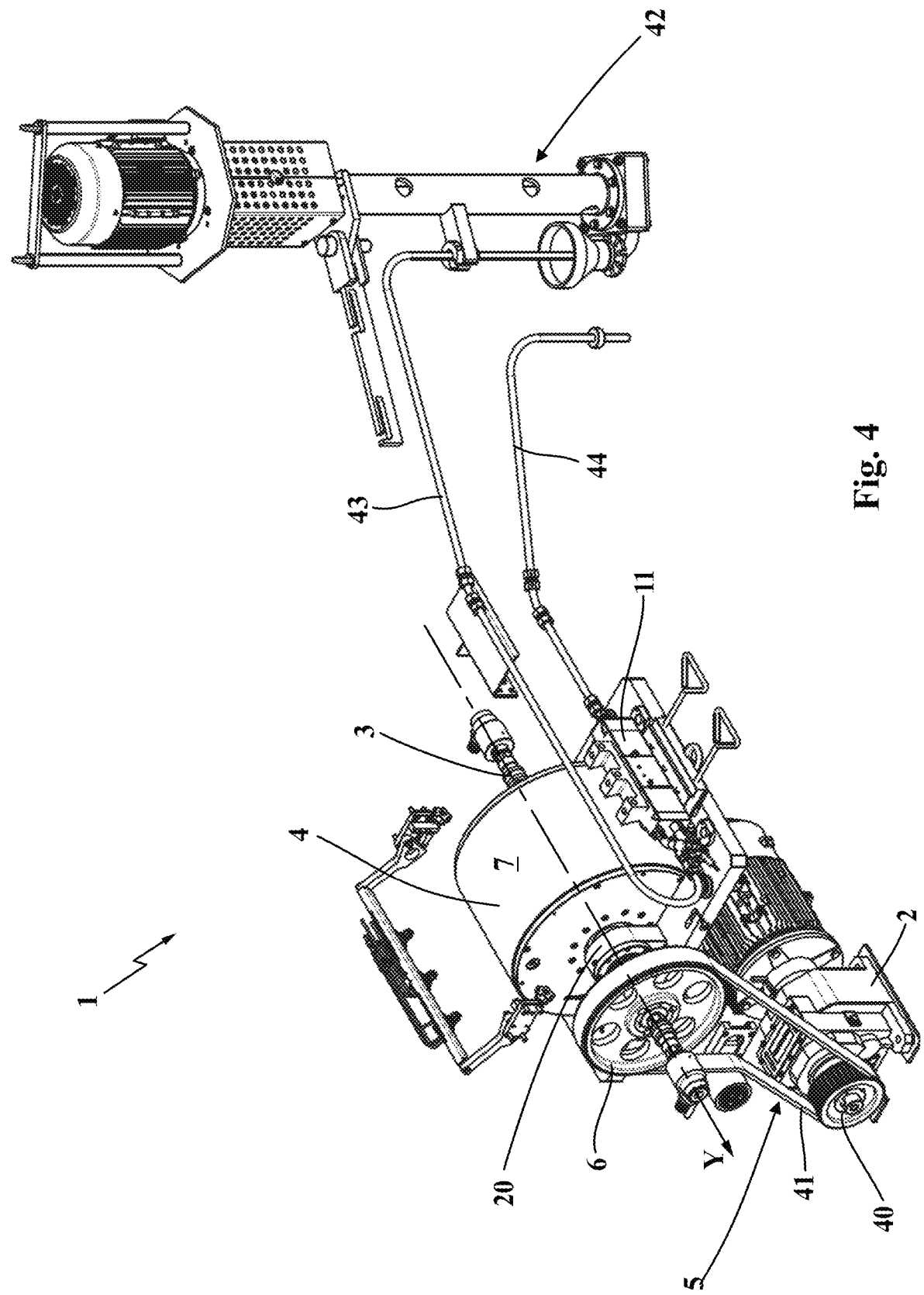
FIG. 4 shows the machine of FIG. 3 with some casing parts hidden in order to better illustrate a sliding block for the distribution of the molten lead alloy on a rotary drum of the same machine according to the invention.
Figure 5:
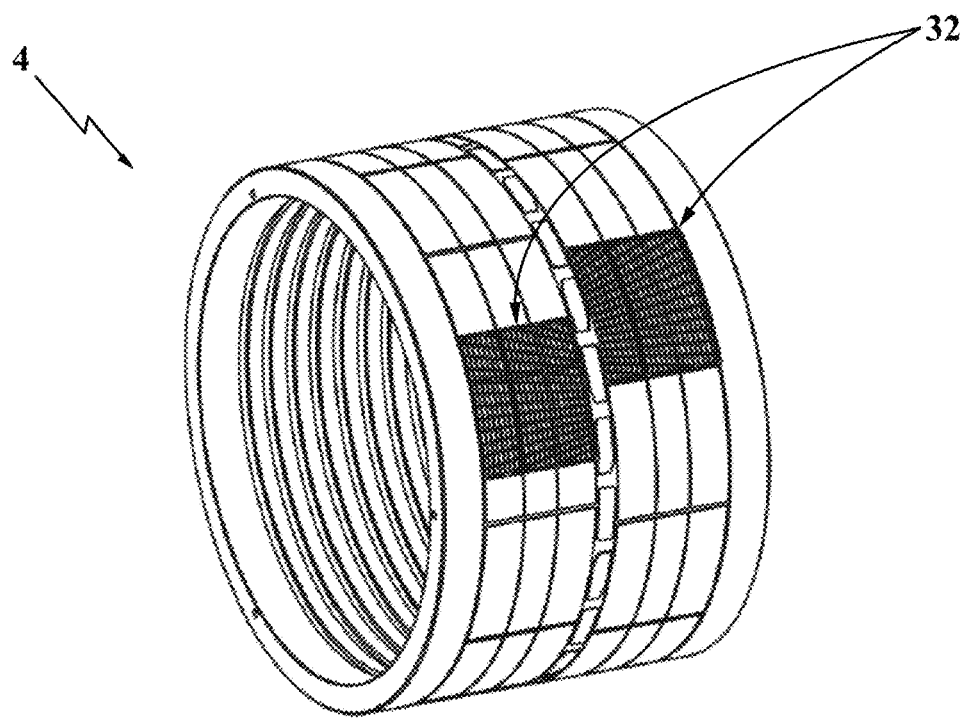
FIG. 5 shows a perspective view of a detail of the machine according to the invention relative to the rotary drum.
Figure 6:
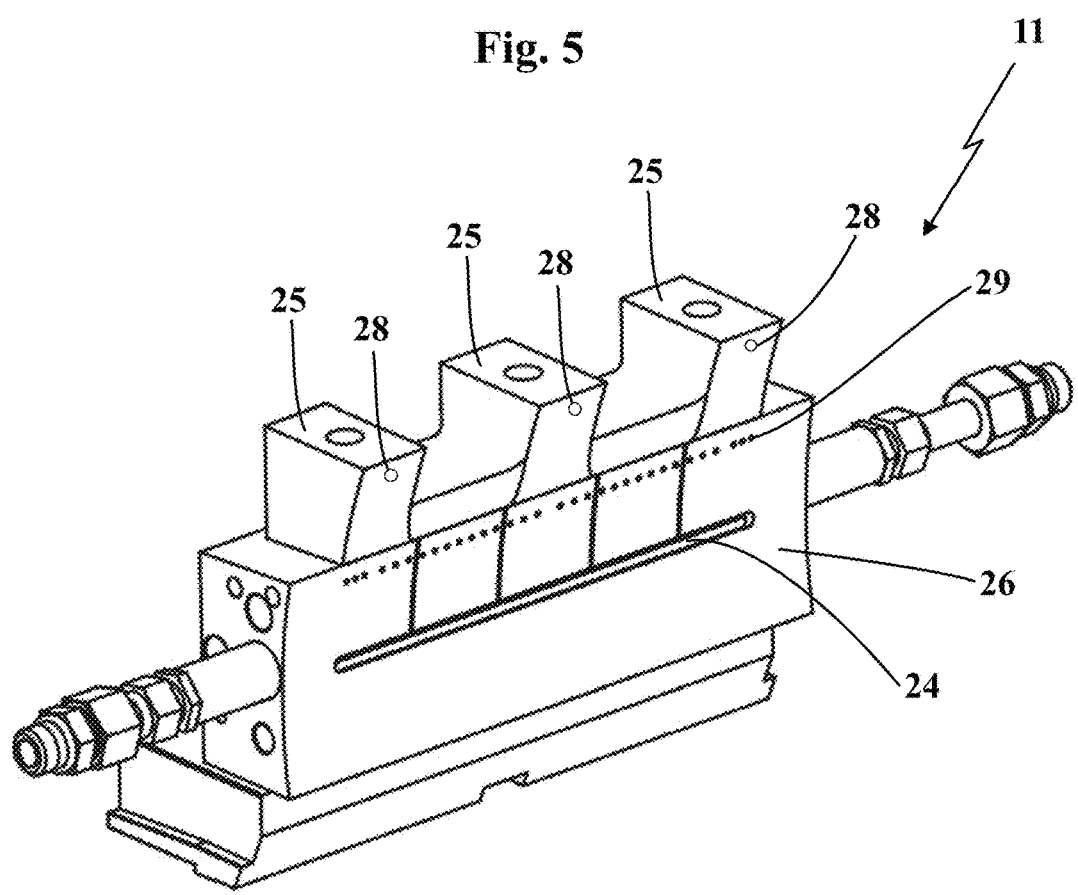
FIG. 6 shows a first perspective view of a detail of the machine according to the invention relative to the sliding block for the distribution of the molten alloy.

With reference to the enclosed drawings, reference number 1 overall indicates the machine for continuous casting of a lead alloy for forming a continuous strip of grids 30 for plates of electric storage batteries, object of the present invention.

Hereinbelow, reference will be made for the sake of description simplicity to a machine 1 adapted to treat a crucible of molten lead for the production of a continuous strip of grids 30 made of lead for electric storage batteries; nevertheless, it is intended that the material that fills the crucible and forms the grid can be any one lead alloy adapted to be employed for forming grids for electric storage batteries.

With particular reference to the enclosed figures, the machine comprises a support structure 2 abutted against the ground, on which—by means of two support bodies 20 with bearings—a shaft 3 is rotatably mounted that concentrically carries a rotary drum 4 fixed thereto. The latter is driven to rotate around its horizontally-arranged rotation axis Y by a motorization device 5, e.g. constituted by a motor with gear motor 40 that transmits its motion by means of a belt or chain 41 to a toothed wheel 6 fit on the shaft 3 of the rotary drum 4.

The rotary drum 4 is provided with an external peripheral surface 7 with a plurality of grooves 32 obtained according to the design of the grid to be made. Such design can vary as a function of the specific application of the storage battery or as a function of the design choices of the storage battery producer. In accordance with the embodiments of the enclosed figures, such design is obtained starting from notches 8, 9 respectively adapted to make circumferential and transverse filaments of the finished grid. Advantageously, also tilted grooves 10 can be provided for which are adapted to make the tilted filling filaments of the same grid. The designs of the grooves can be different in accordance with the different applications or production choices. The aforesaid plurality of grooves 32 comprises at least one first series of circumferential notches 8 (or even only two circumferential notches), which are extended on the external surface 7 of the rotary drum 4 and which are intended to form, by means of the molten lead which is cast therein, the two first longitudinal sides of at least one first succession of grids 33 forming the continuous strip of grids 30 made of lead.

The plurality of grooves also comprises a second series of transverse notches 9 which are transversely extended with respect to the rotary drum 4, or substantially parallel to the rotation axis Y. Such transverse notches 9 are intended to form, by means of the lead casting better specified hereinbelow, two second transverse sides of at least one first succession of grids 33 of the continuous strip; in substance, each grid is defined by two circumferential notches 8 and by two transverse notches 9.

Figure 10:
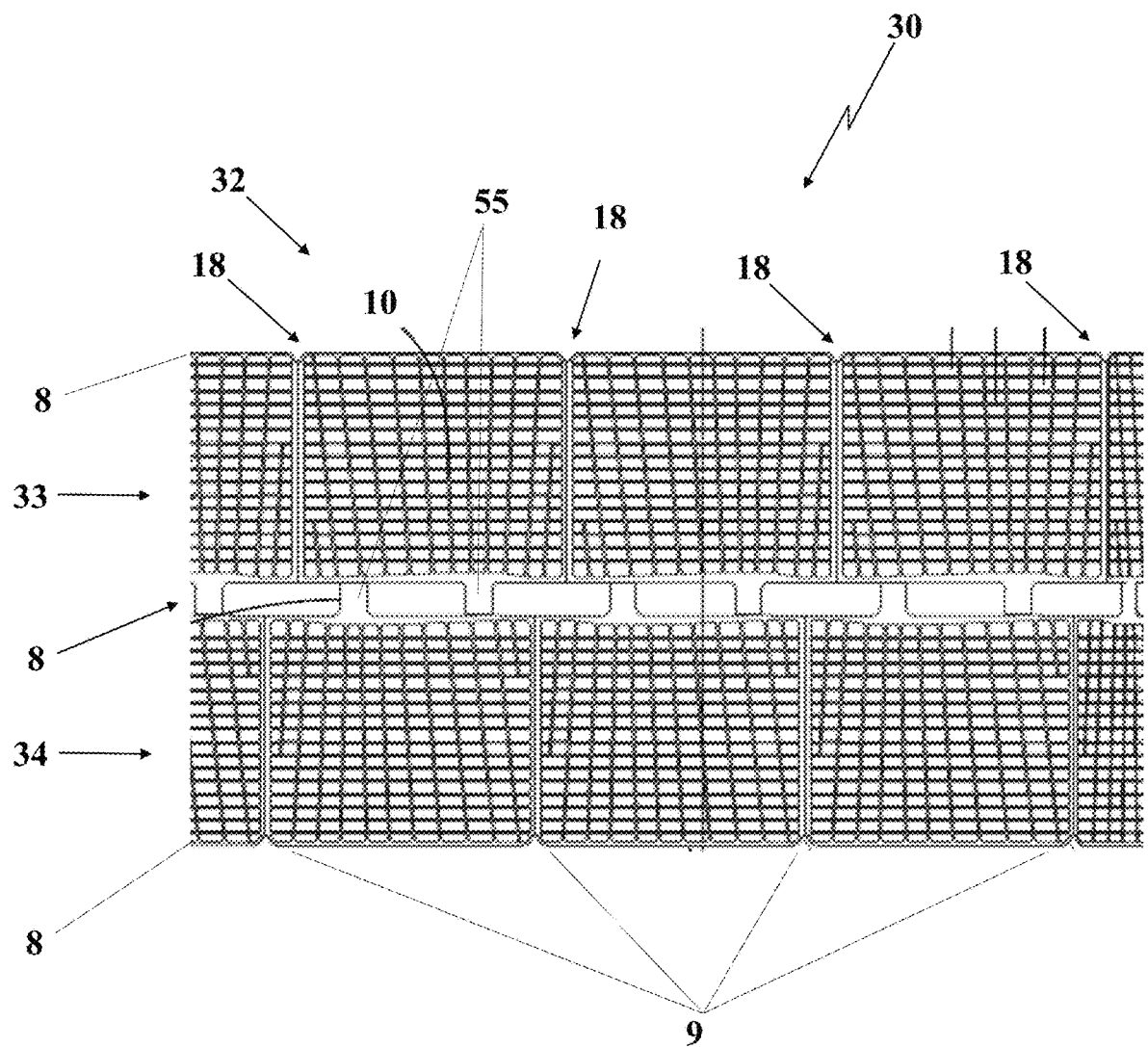
FIG. 10 shows a segment of continuous strip of grids, which exits from the machine according to the present invention.

In particular, there will be two successions of grids, advantageously in accordance with the figures of the embodiments of the invention, i.e. the first abovementioned succession of grids 33 and a second succession of grids 34 side-by-side the first succession of grids 33 of the continuous strip. The two successions of grids are separated by a central circumferential notch 8 (drawn more enlarged in FIG. 10 in order to form also the flags 55 of the grids). For illustration simplicity in FIGS. 1 and 2, 33 and 34 do not indicate the successions of grids but rather the corresponding successions of grooves which lead to the formation of the aforesaid successions of grids.

One of the circumferential notches 8 is also provided with a plurality of quadrangular depressions 31 in order to form conventional flags 55 for the welding contact of the grids.

Figure 11:
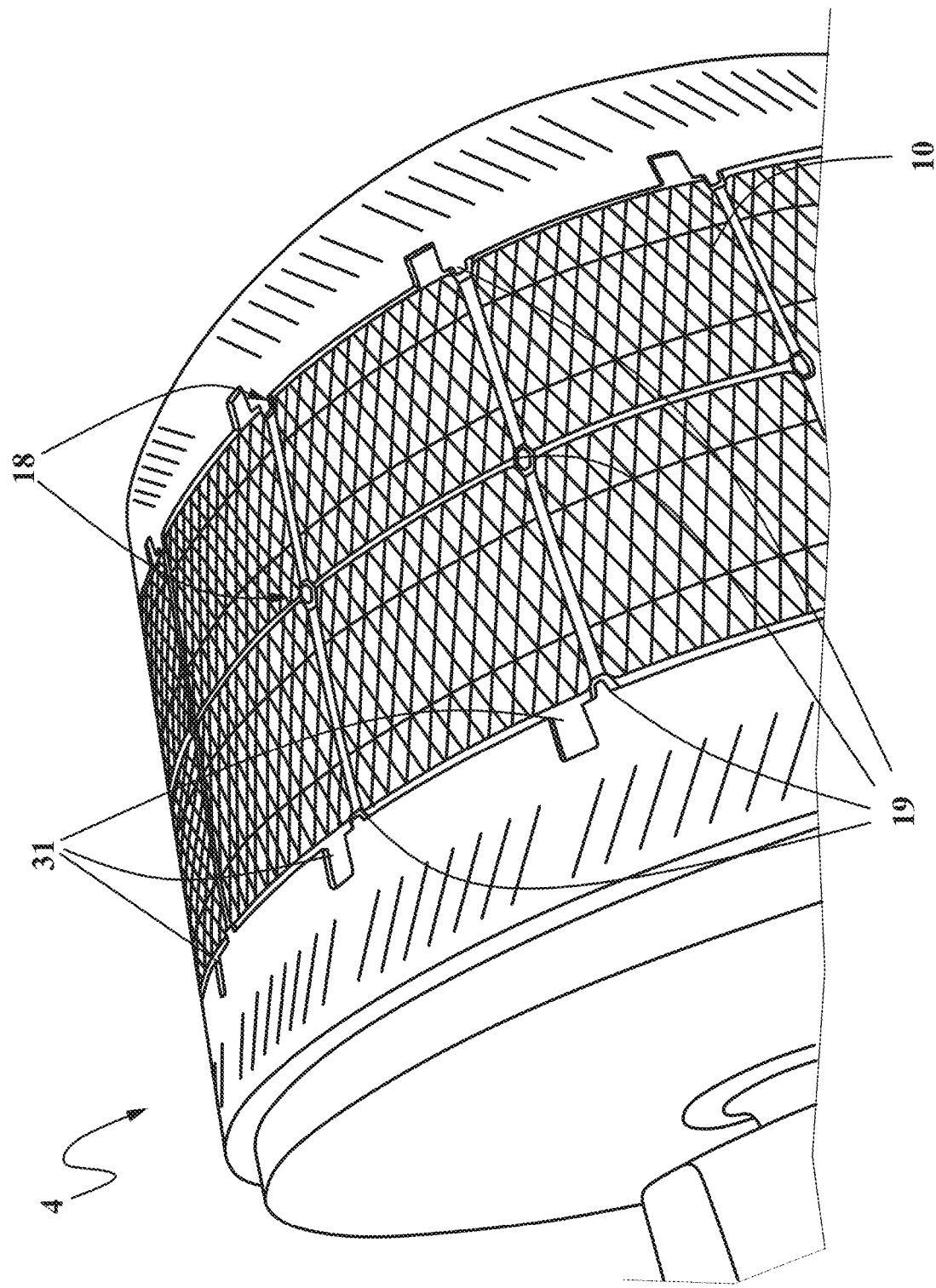
FIG. 11 shows a second embodiment of the rotary drum of the machine according to the present invention.
Figure 12:
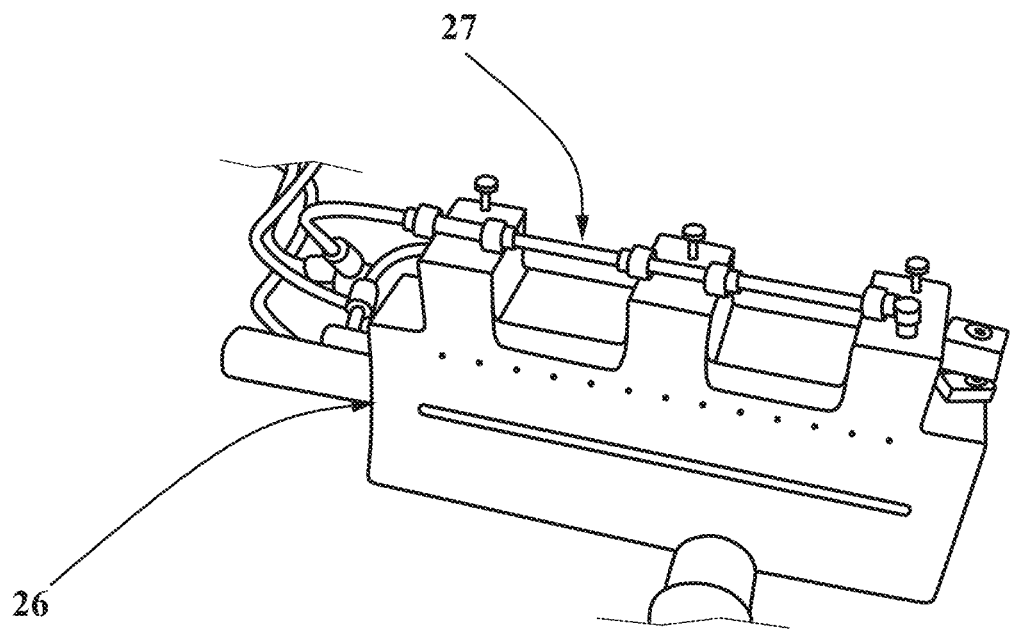
FIG. 12 shows the sliding block of the machine according to the present invention illustrated in a further perspective view.
Figure 13:
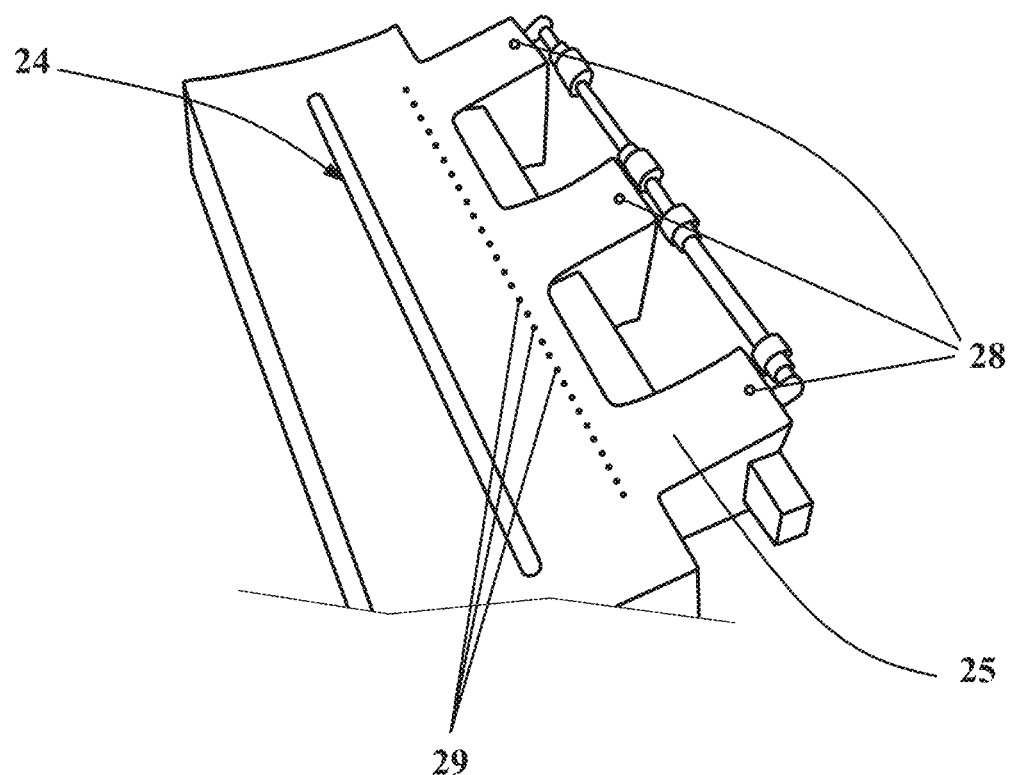
FIG. 13 shows the sliding block of FIG. 12 in a further perspective view.
Figure 14:
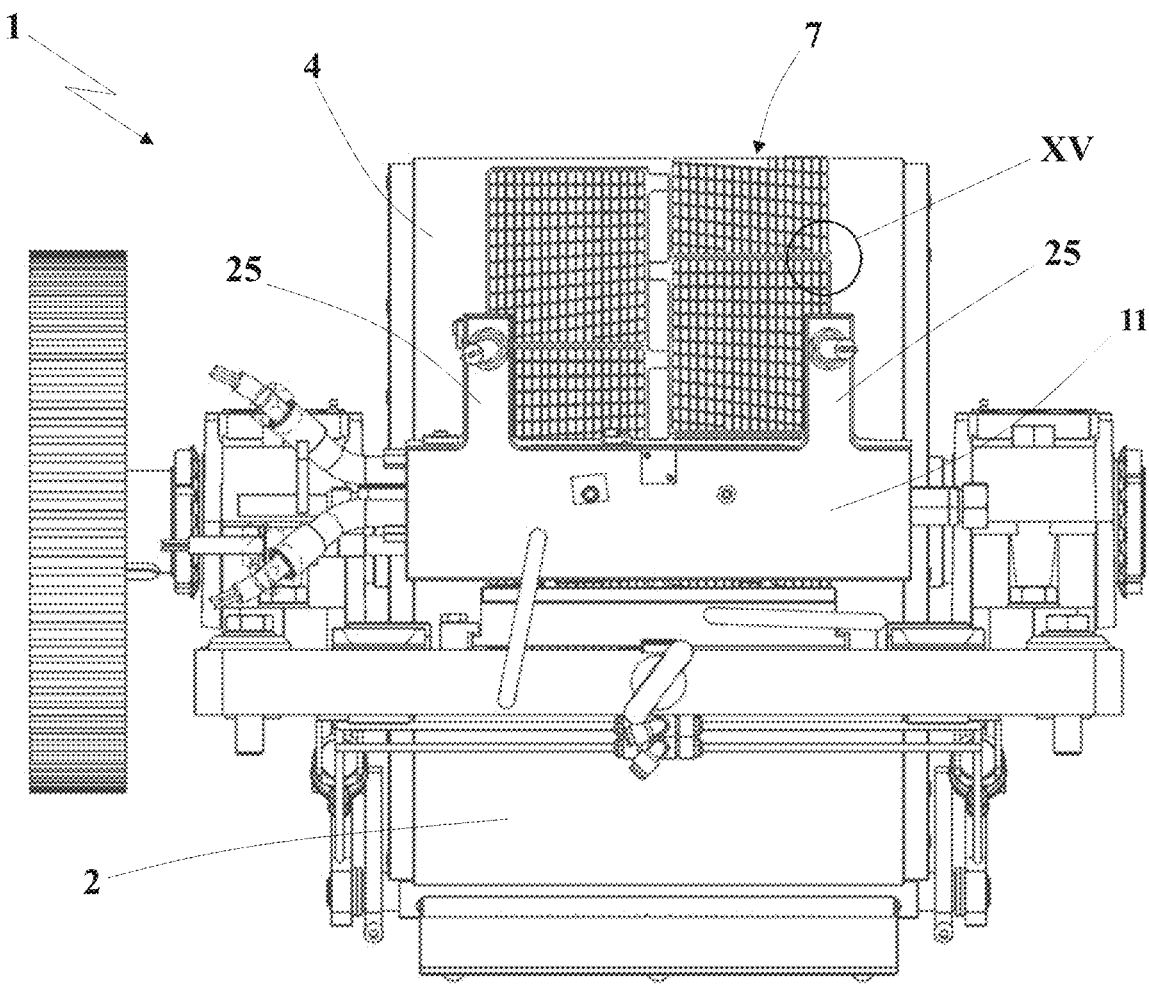
FIG. 14 shows a side view of a third embodiment of the casting machine, object of the present invention.

Such flags 55 are provided between the two successions of grids in the case of the embodiments of FIGS. 1, 2, 10, 14 and laterally with respect to the two successions of grids 33 and 34 in the case of the embodiment of FIG. 11.

The notches, circumferential and transverse 8 and 9, meet at a plurality of vertices 18 intended to form the corners of the first and second succession of grids 33 and 34 of the continuous strip of grids 30 made of lead.

The machine also comprises a sliding block 11 fixed to the support structure 2. The sliding block 11 is constituted by a metal body having a curved internal surface 13, with concavity corresponding to the convexity of the external surface 7 of the rotary drum 4 such that it can be coupled thereto, delimiting together with the plurality of grooves 32 the containment mold for the molten lead to be molded in the form of a continuous strip of grids. For such purpose, an adjustment system is provided for calibrating the seal pressure of the sliding block 11 against the rotary drum 4.

The sliding block 11 is advantageously maintained at controlled temperature by means of a heating system and preferably also by means of a cooling system.

Figure 18:
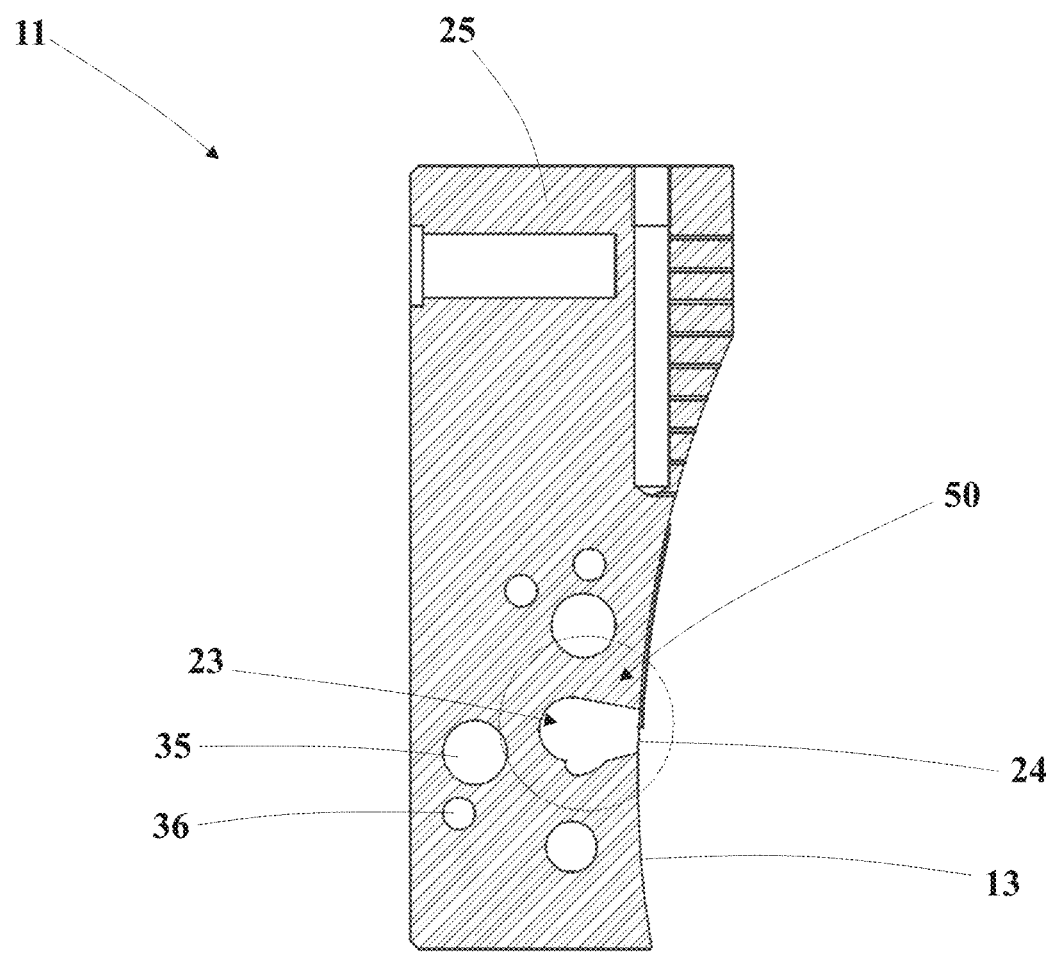
FIG. 18 shows a sectional view of the sliding block illustrated in FIG. 17 according to the trace XVIII-XVIII of FIG. 17 itself.
Figure 19:
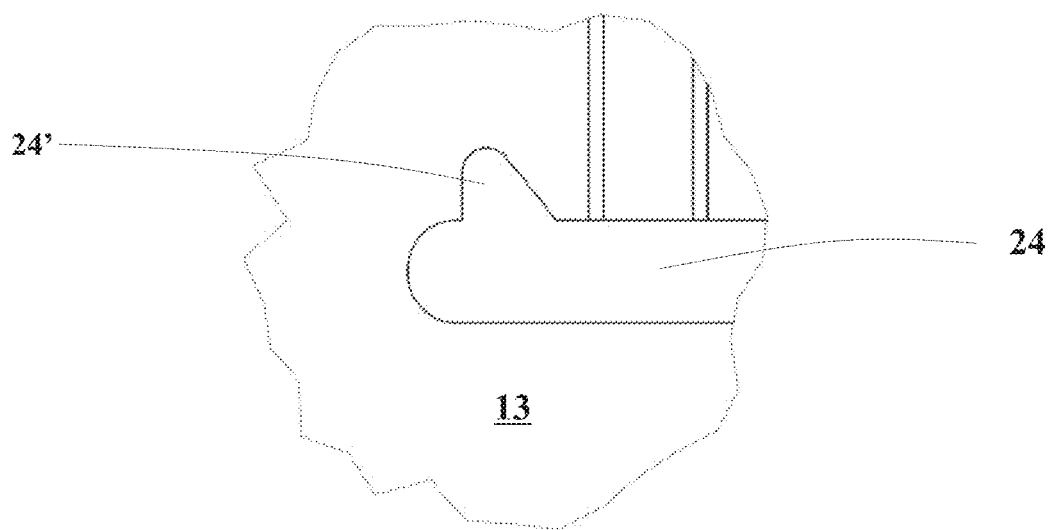
FIG. 19 shows a detail of the sliding block illustrated in FIG. 17, reported within the area XIX of FIG. 17 itself.

More in detail the heating system is constituted by electrical heating elements, of which 35 indicates the seat in the sectional view of FIGS. 8 and 18, in order to maintain the lead at the liquid state at the desired viscosity and allow an optimal distribution thereof in the grooves 32 of the external surface 7 of the rotary drum 4. The cooling system is constituted by a plurality of channels 36 for the passage of a coolant fluid, advantageously constituted by air and an inert gas such as nitrogen.

The sliding block 11 operatively and mechanically carries, associated therewith, a distribution system 50 for distributing the molten lead connected to a feeding system 100 for the same lead to be distributed. The latter is for example constituted by a lead crucible in which a pump 42 draws which, through a delivery piping 43, sends the molten lead flow necessary for filling the grooves 32 to the distribution system 50. More in detail, the distribution system 50 comprises a distribution tube 22 housed in a longitudinal channel 23 made in the sliding block 11 parallel to the rotation axis Y. The distribution tube 22 is provided with holes which allow the liquid lead to exit and fill the longitudinal channel 23 of the sliding block 11 under pressure. The latter channel 23 has an elongated slit 24 (in particular made on the internal surface 13 of the sliding block 11) facing the surface of the rotary drum 4, parallel to the rotation axis of the latter substantially for the entire width thereof for the purpose of inserting the molten lead in the grooves 32 made on the surface of the rotary drum 4. In particular, the elongated slit 24 is extended along an extension direction Z parallel to the rotation axis Y of the rotary drum 4 at least for the distance present between the two circumferential notches 8 of the latter. Through the elongated slit 24, the molten lead is susceptible of being dispensed in the grooves 32 of the rotary drum 4 for the formation of the grids.

In operation, the molten lead distribution system 50 thus attained inserts a flow of molten lead inside the grooves 32 of the external peripheral surface 7 of the rotary drum 4, filling such grooves when passing in front of the sliding block 11 during the rotation of the rotary drum 4 itself.

The excess molten lead contained under pressure in the longitudinal channel of the sliding block 23 returns back into the lead crucible of the furnace through a return piping 44.

According to the idea underlying the present invention, the external peripheral surface 7 of the rotary drum 4 comprises a plurality of studs 19 placed within at least one of the two circumferential notches 8, at the vertices 18 and to interrupt the circumferential continuity of the same notches 8. Such studs 19 intercept the circumferential notches 8, appearing as solid portions which interrupt the continuity of such circumferential grooves 8. They are intended to shape the corners of the at least one first succession of grids 33 (and preferably of the two successions of grids illustrated in the embodiments of the enclosed figures) of the continuous strip of grids 30 made of lead, conferring an advantageous smoothed form to the same corners. In particular, the studs 19 are arranged at least in the circumferential notch 8 which defines the side of the grid with which the latter is inserted in the wrap of the electric storage battery (e.g. the side of the grid opposite that on which the flags 55 are arranged). Of course, the studs 19 can also be arranged in both circumferential notches 8, in a manner such that the obtained grid can be inserted with any side within the wrap.

Advantageously, each stud 19 has at least one shaped edge 19' with rounded and concave shape, which is configured for shaping a corresponding rounded corner of the grids, in order to facilitate the insertion thereof in the wraps without jamming on the latter, which can cause the damage thereof.

Figure 15:
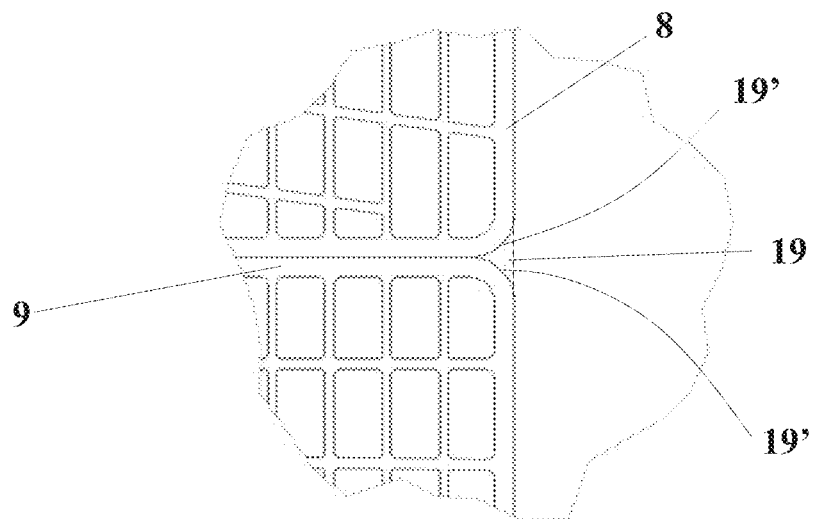
FIG. 15 shows a detail of the drum of the machine illustrated in FIG. 14, reported within the area XV of the FIG. 14 itself.
Figure 16:
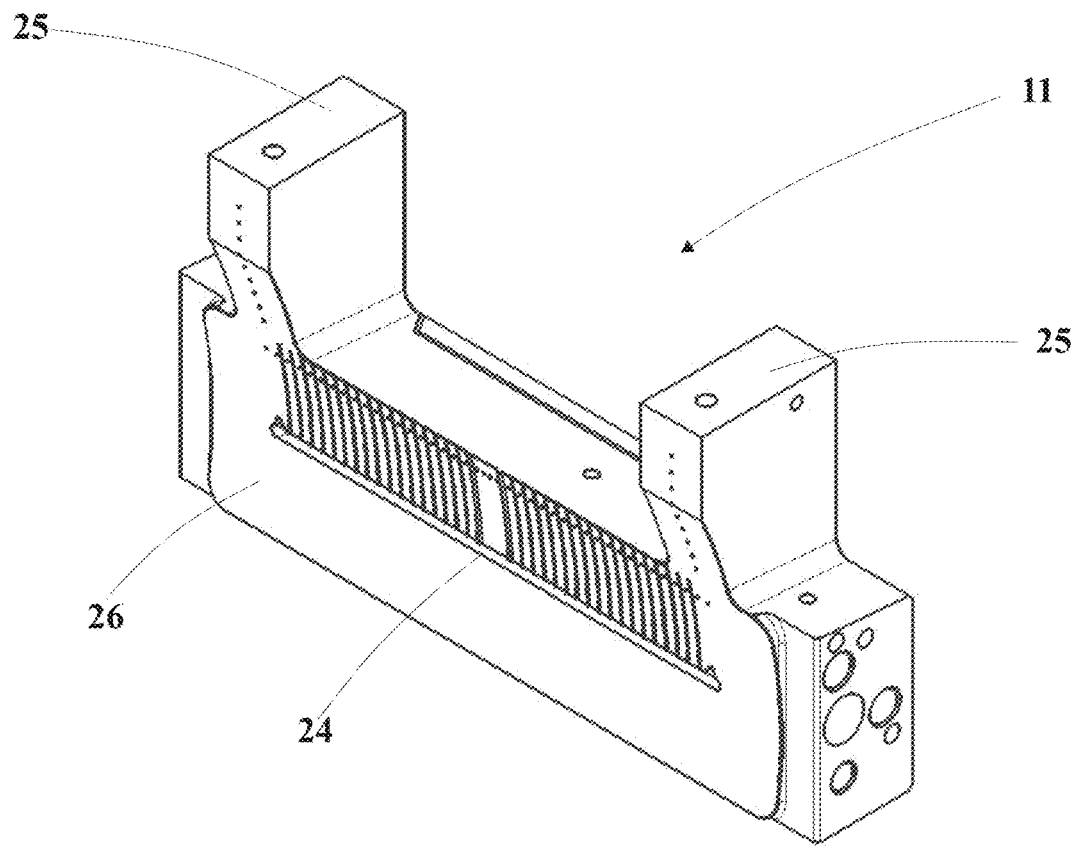
FIGS. 16 and 17 show two views, respectively perspective and front, of the sliding block of the machine illustrated in FIG. 14.
Figure 17:
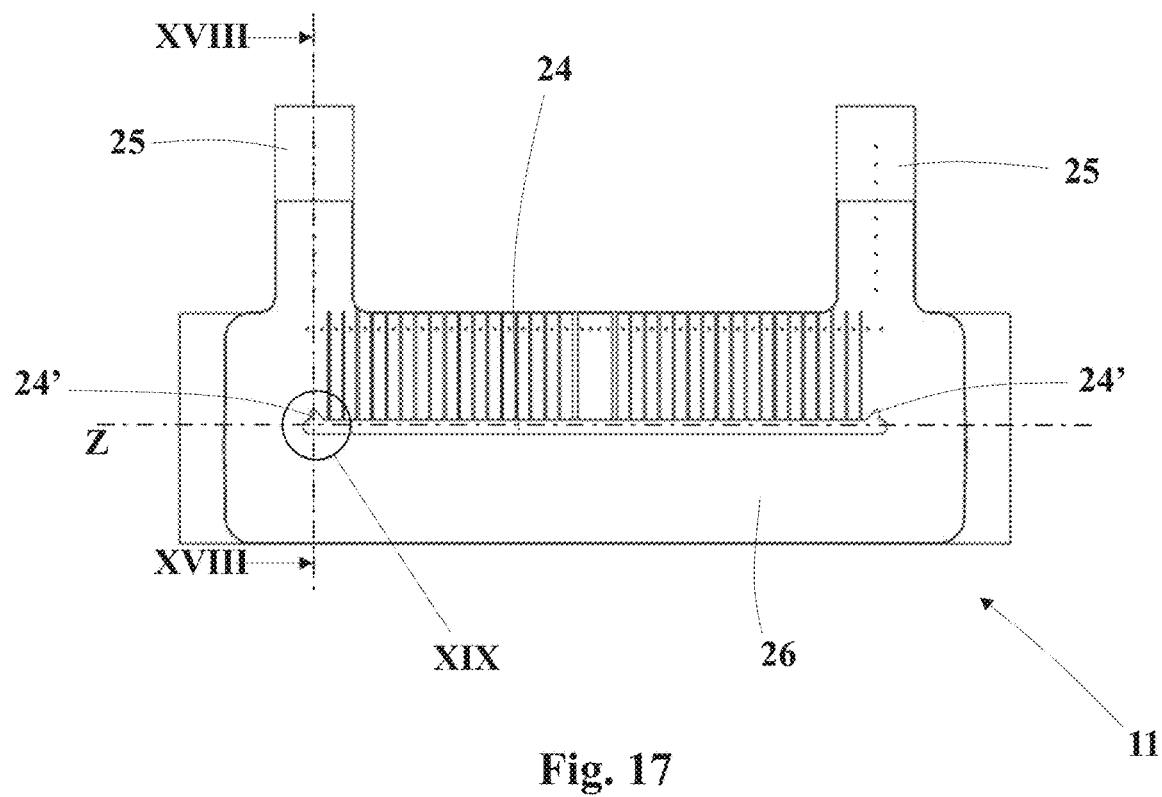

Preferably, with reference to the embodiment of FIG. 15, each stud 19 is provided with two shaped edges 19', directed in opposite sense with respect to each other, in a manner such to shape the corresponding corners of two adjacent grids of the succession of grids.

In accordance with the embodiments of the present invention, as already previously mentioned, the plurality of grooves 32 also comprises at least one third circumferential notch, laterally flanking a first notch of the two preceding circumferential notches 8 and intended to form—together with the first circumferential notch—two second longitudinal sides of at least one second succession of grids 34 of the continuous strip of grids 30 made of lead. The plurality of transverse notches 9 parallel to the rotation axis Y of the rotary drum 4 is in this case also extended to the second succession of grids 34 in order to form the two second transverse sides of each grid of said first and of said second succession of grids 33 and 34. The circumferential 8 and transverse 9 notches delimit, on the external surface 7 of the rotary drum 4, a plurality of areas corresponding to the surfaces of the grids to be formed within which filling grooves are advantageously provided for. In such filling grooves, the lead will be solidified, forming the internal filaments of each grid. Such filling grooves can comprise circumferential and/or transverse and/or oblique notches.

In addition, the sliding block 11 advantageously has, at the circumferential notches 8 of the rotary drum 4 in which the studs 19 are present, extension portions 25 which are circumferentially extended in the sense opposite that of rotation of the rotary drum 4. Advantageously, such extension portions 25 are provided with a thermoregulation device 70, not illustrated in detail in the enclosed figures, and for example also constituted by heating elements (schematized in the embodiment of FIG. 8), adapted to keep the lead alloy in molten state fluid. In accordance with a different embodiment, the extension portions 25 lack a thermoregulation device.

Preferably, the extension portions 25 are extended starting from a common base 26 of the sliding block 11 and can be advantageously comb-like separated by interposed empty spaces 60. Of course, without departing from the protective scope of the present invention, the extension portions 25 can also be connected together in a continuous manner (i.e. without empty spaces between them), for example they can be part of a same extension base, being extended without interruption for the entire width of the sliding block 11.

In particular, the extension portions 25 are advantageously extended for a section of length at least adapted to cover the end of the travel of the molten lead emitted by the distribution system 50 within the circumferential notches 8 immediately after the passage of the studs 19, when the molten lead re-ascends in the circumferential notches in the direction opposite the rotation of the rotary drum 4.

In operation, during the operation of the machine 1, the elongated slit 24 of the sliding block 11 comes to be periodically situated opposite the studs 19 arranged within the circumferential notches 8 of the rotary drum 4. In this configuration, immediately after the passage of the stud 19, there is a re-ascent of the molten lead, in a sense opposite that of rotation of the rotary drum 4, along the circumferential notch 8. Such re-ascent of the fluid is stopped upon reaching a configuration of equilibrium between the inertial forces (the pressure which causes the re-ascending) and the viscous friction forces between the molten lead and the rotary drum 4, which tend to drive the molten lead in the rotation sense of the rotary drum 4. In the embodiment presented in the enclosed figures, the sliding block 11 has extension portions 25 having a circumferential length advantageously equal to or greater than circumferential distance between two studs 19 on said rotary drum 4, so to prevent lead leaks during the lead re-ascending step.

In general, the extension portions 25 are protuberances of length such to prevent—after the passage of each stud 19 of the corresponding circumferential notch 8 of the rotary drum 4—the lead that re-ascends such circumferential notch 8 from exiting the sliding block 11.

Advantageously, in accordance with the embodiment illustrated in FIGS. 16-19, the elongated slit 24 of the sliding block 11 is provided with at least one enlarged section 24' which is arranged in front of the corresponding circumferential notch 8 provided with studs 19. In particular, in accordance with the illustrated embodiment, the elongated slit 24 is provided with two aforesaid enlarged sections 24' arranged in front of respective circumferential notches 8, preferably at the ends of the elongated slit 24 itself.

Advantageously, the enlarged section 24' is projectingly extended orthogonal to the extension direction Z of the elongated slit 24, in particular in a sense opposite the rotation sense of the rotary drum 4 and, preferably, towards the corresponding extension portion 25 of the sliding block 11.

In operation, such enlarged sections 24' are susceptible of being occupied by an additional volume of molten lead, which allows facilitating a stronger structure of the solidified lead that constitutes the grids. More in detail, the molten lead portion which, after the passage of the stud 19 of the rotary drum 4, re-ascends along the corresponding longitudinal notch 8 of the latter, tends to be cooled, reducing its fluidity towards a more solid state. When such cooled lead portion, following the rotation of the rotary drum 4, returns to the elongated slit 24, it comes into contact with the molten lead that just exited from the distribution system 50 which has a higher temperature. Such temperature difference between the lead that just left the distribution system 50 and that of the re-ascended lead portion would be susceptible of generating points of discontinuity in the crystalline structure of the lead of the grids, at which the grids would be subjected to be more easily broken.

The aforesaid enlarged sections 24' of the elongated slit 24 allow accumulating, at the respective circumferential notches 8, a reserve of molten lead at a temperature sufficiently high for newly melting the re-ascended lead portion that has cooled, in substance bringing it back to the same state of fluidity and temperature as the molten lead exiting from the distribution system 50, therefore ensuring a uniformly continuous structure of the lead of the grids at the forming operating speed of the machine 1 (e.g. 30 meters/minute).

The sliding block 11 also comprises advantageously an insufflation system 27 for insufflating inert gas, e.g. nitrogen, which is provided with first openings 28 placed at the extension portions 25 and advantageously directed towards the circumferential notches 8. More in detail, such first openings 28 are placed in the free end zones of the extension portions 25.

The insufflation system 27 advantageously also comprises second openings 29, which are placed at the base 26, preferably in the region of the elongated slit 24 of the sliding block 11. Such second openings 29 are longitudinally aligned along the entire length of the sliding block 11 and are advantageously directed towards the plurality of grooves 32 of the rotary drum 4.

The rotary drum 4 is cooled by means of cooling system that is per se known to a man skilled in the art and hence is not described in detail herein. Such cooling system can for example comprise a circuit for circulating a cooling fluid, which through the use of a pump is sent to the internal chamber contained within the rotary drum 4 and is drawn from the latter in order to make a closed circuit. Preferably, such circuit provides for sending the fluid into the drum 7 and for drawing it from the drum by means of the two ends of the shaft 3, which for such purpose is suitably hollow.

The present invention advantageously allows preventing the oxidation of the lead. Indeed, during the step of depositing the molten lead on the drum, in some points a contact can occur between the ambient oxygen and the still-molten material. This direct contact with the oxygen gives rise to oxidative phenomena which compromise the chemical and mechanical properties.

The finding thus conceived therefore attains the pre-established objects.

The invention claimed is:

1. A machine for continuous casting of a lead alloy for forming a continuous strip of grids (30) for plates of electric storage batteries, wherein said machine comprises:
    a support structure (2) abutted against the ground;
    a rotary drum (4), which is rotatably mounted on said support structure (2) around a rotation axis (Y), and is provided with an external peripheral surface (7) having a plurality of grooves (32) obtained according to a grid design to be made;
    a sliding block (11), which is fixedly mounted on said support structure (2), has an internal surface (13) of curved shape adapted to be coupled in sliding relation with the external surface (7) of said rotary drum (4), and is provided with a distribution system (50) for distributing molten lead; wherein said distribution system (50) is configured for receiving a flow of molten lead from a feeding system (100), and for inserting said molten lead within the grooves (32) of said external peripheral surface (7), filling said grooves (32) during the rotation of said rotary drum (4), in order to form a continuous strip of grids (30) made of lead;
    wherein said plurality of grooves (32) comprise:
    at least two circumferential notches (8) spaced from each other and intended to form, by means of the molten lead emitted by the distribution system (50) of said sliding block (11), two first longitudinal sides of at least one first succession of grids (33) of said continuous strip of grids (30) made of lead;
    at least one plurality of transverse notches (9), which are parallel to the rotation axis (Y) of said rotary drum (4), are spaced from each other, and are intended to form, by means of the lead emitted by the distribution system (50) of said sliding block (11), two second transverse sides of each grid of said at least one first succession of grids (33);

wherein said at least two circumferential notches (8) and said at least one plurality of transverse notches (9) meet at a plurality of vertices (18) intended to form corners of the at least one first succession of grids (33) of said continuous strip of grids (30) made of lead;

wherein said machine comprises a plurality of studs (19), which are placed within at least one of said at least two circumferential notches (8) at said vertices (18) to interrupt the circumferential continuity of said at least one circumferential notch (8), and are configured for shaping in smoothed form the corners of the first succession of grids (33) of said continuous strip of grids (30) made of lead;

wherein said sliding block (11) comprises at least one extension portion (25) which is arranged at said at least one circumferential notch (8) provided with said studs (19), and is circumferentially extended in the sense opposite a direction of rotation of said rotary drum (4).

2. The machine of claim 1, wherein said plurality of grooves (32) also comprises at least three circumferential notches (8) wherein one of said at least three circumferential notches is laterally flanking a first circumferential notch of said at least three circumferential notches (8) and intended to form, together with said first circumferential notch, two second longitudinal sides of at least one second succession of grids (34) of said continuous strip of grids (30) made of lead;

wherein said plurality of transverse notches (9), which are parallel to the rotation axis (Y) of said rotary drum (4), are extended to said at least one second succession of grids (34) in order to form two second transverse sides of each grid of said first and of said second succession of grids (33, 34).

3. The machine of claim 1, wherein said at least one extension portion (25) is associated with a thermoregulation device (70) configured for keeping said molten lead alloy fluid.

4. The machine of claim 1, wherein said at least one extension portion (25) are extended for a section susceptible of intercepting a travel of the molten lead emitted by said distribution system (50) in said at least two circumferential notches (8) upon passage of said studs (19) beyond said distribution system (50).

5. The machine of claim 1, wherein said sliding block (11) comprises:

a common base (26), and multiple said extension portions (25), which are extended from said common base (26) and are transversely separated by empty spaces (60).

6. The machine of claim 1, further comprising an insufflation system (27) configured for insufflating inert gas, wherein said insufflation system (27) comprises at least first openings (28) placed at said at least one extension portion (25) and directed towards said at least two circumferential notches (8).

7. The machine (1) of claim 5 further comprising an insufflation system (27) configured for insufflating inert gas, wherein said insufflation system (27) comprises at least first openings (28) placed at said at least one extension portion (25) and directed towards said at least two circumferential notches (8);

wherein said insufflation system (27) further comprises at least second openings (29) placed on said common base (26) and directed towards said plurality of grooves (32) of said rotary drum (4).

8. The machine of claim 1, wherein said sliding block (11), at said extension portion (25), has a circumferential length at least equal to a circumferential distance between two studs of said plurality of studs (19) placed in succession along the corresponding said circumferential groove (8) of said rotary drum (4).

9. The machine of claim 1, wherein each of said plurality of studs (19) has at least one shaped edge (19'), which has a rounded and concave shape, and is configured for shaping a corresponding rounded corner of said grids.

10. The machine of claim 1, wherein said distribution system (50) comprises at least one distribution tube (22) which is housed in a longitudinal channel (23) made in said sliding block (11); wherein said longitudinal channel (23) is extended parallel to said rotation axis (Y) and is provided with an elongated slit (24), which is made on the internal surface (13) of said sliding block (11), faces the external peripheral surface (7) of said rotary drum (4) and is extended along an extension direction (Z) parallel to said rotation axis (Y) between said two circumferential notches (8), and through such elongated slit (24) said molten lead is susceptible of being dispensed in the grooves (32) of said rotary drum (4);

wherein said elongated slit (24) is provided with at least one enlarged section (24') each of which is arranged at one of said at least two circumferential notches (8) provided with said studs (19) and is projectingly extended orthogonal to said extension direction (Z).

* * * * *